United States Patent [19]

Ohgushi

[11] Patent Number: 4,714,507

[45] Date of Patent: Dec. 22, 1987

[54] SURFACE COATING AGENT AND METHOD FOR USING THE SAME IN CIVIL AND CONSTRUCTION ENGINEERING

[76] Inventor: Yoshiyuki Ohgushi, 8-2, Nagao 2-chome, Johnan-ku, Fukuoka, Japan

[21] Appl. No.: 795,392

[22] Filed: Nov. 6, 1985

[51] Int. Cl.⁴ .......................... B32B 31/12; B32B 7/08
[52] U.S. Cl. ........................................ 156/91; 52/514; 106/33; 106/90; 156/94; 264/36; 404/75; 404/82; 427/140; 428/63
[58] Field of Search ...................... 52/514; 106/33, 90; 156/91, 92, 94; 264/36; 404/75, 82; 427/140; 428/63

[56] References Cited

U.S. PATENT DOCUMENTS 4,540,723  9/1985  Ying ................................. 523/115
4,668,548  5/1987  Lankard ............................. 428/63

Primary Examiner—Robert A. Dawson
Attorney, Agent, or Firm—Jordan and Hamburg

[57] ABSTRACT

In civil engineering and construction engineering, surfaces are coated with a novel composition essentially consisting of a mixture made of (a) a principal ingredient including cement, silica sand, iron oxide, zinc oxide and glycine and (b) a composite polymer emulsion including carboxy-modified styrene-butadiene, cyclohexyl methacrylate, and styrene polymers, wherein the mixing ratio of said mixture is 2–6:1.

7 Claims, 15 Drawing Figures

SURFACE COATING AGENT AND METHOD FOR USING THE SAME IN CIVIL AND CONSTRUCTION ENGINEERING

BACKGROUND OF INVENTION

Prevention of concrete cracks has been a headache for architects for many years. Huge amounts of money have been spent year by year for their repair.

Concrete is basically a brittle material. It shrinks from slurry state to solid state during curing. Since concrete is easily affected by the change of surrounding temperature, outside force and pressure during curing stage, cracking thereof is almost unavoidable.

Cracking will cause the concrete to become brittle due to neutralization. The rigidity and strength will deteriorate and finally the entire structure is damaged.

Heretofore, mortar is often used to provide protection against cracking or other rupture of concrete. Mortar is, however, not strong enough in its physical properties to prevent the cracking perfectly.

Meanwhile, iron reacts with oxygen in the air, and other materials (chlorine, fluorine, sulfurous acid gas), and also bacteria, causing corrosion and rusting.

For preventing such corrosion and rusting of the iron or other metals, conventionally, various surface coating agents have been developed as surface coating agents for metals, especially iron.

However, the difference in expansion temperature rate between a metallic substrate and the coating agent has caused degradation of the coating and shortening of its service life.

Furthermore, certain surface coating agents are applied to plastics for added resistance to weathering. Again, the resulting films are not durable; they rarely adhere securely and permanently to the substrate and will easily peel off.

Among various surface coating agents, organic solvent type coating agent gives relatively good adherence and durability but presents problems of environmental pollution with the solvent evaporated in the course of application.

Emulsion type of coating agents, on the contrary, cause less environmental contamination, but the coating films are inferior in both adherence and durability. In addition, they can corrode the substrate, when the latter is metallic.

Accordingly, it is an object of the present invention is to provide a surface coating agent capable of forming highly adherent, durable, corrosion-resistant coating films adapted for universal use on varied surfaces without deteriorating the substrate.

It is another object of the present invention to provide various methods for effectively using the above surface coating agent.

SUMMARY OF INVENTION

According to the invention, the surface coating agent comprises a principal ingredient consisting mostly of cement silicon dioxide, generally in the form of silica sand, iron oxide, zinc oxide, and glycine and a composite polymer emulsion composed mainly of carboxy-modified styrene-butadiene polymer, wherein the ratio of principal ingredient to the composite polymer is 2.0 to 6.0:1.

By coating the surface of concrete having cracks with the above surface coating agent, the resulting elastic and penetrative filling will enable the concrete structure to withstand drastic changes of surrounding temperature.

Futhermore, due to its bonding with metal ions, resulting from the ionic bond oxidation character of the metal, the surface coating agent of the present invention forms a highly oxidizing film when it is penetrates and is urged into rust on the metal.

DESCRIPTION OF THE PREFERRED EMBODIMENTS

Preferred embodiments of the invention will now be described in detail hereinafter.

First Embodiment

In this embodiment, the procedure of producing the surface coating agent of the present invention and properties of the surface coating agent are disclosed.

First, the manner of preparing the composite polymer emulsion is explained.

Such emulsion is preferably prepared in following manner as shown in examples 1 and 2.

EXAMPLE 1

| | |
|---|---|
| carboxy-modified styrene-butadiene polymer latex | 13 wt % |
| cyclohexyl methacrylate-styrene copolymer latex | 56 wt % |
| fatty acid sodium soap | 1 wt % |

-continued

| water | 25 wt % | are mixed in the foregoing weight proportions in the following order.

First, the fatty acid sodium soap is dissolved in water. Carboxy-modified styrene-butadiene polymer latex is slowly added, with stirring, to the aqueous soap solution. Next, cyclohexyl methacrylate-styrene copolymer latex is added similarly.

In this way, an aqueous dispersion of the polymers is formed.

EXAMPLE 2

| carboxy-modified styrene-butadiene polymer latex | 13 wt % |
| styrene polymer latex | 28 wt % |
| cyclohexyl methacrylate polymer | 28 wt % |
| fatty acid sodium soap | wt % |
| water | 30 wt % | are mixed together in the foregoing weight proportions in the following order.

First, the fatty acid sodium soap is dissolved in water. Then, carboxy-modified styrene-butadiene polymer latex is slowly added under stirring, followed by the addition of cyclohexyl methacrylate polymer in a similar manner. Thus, an aqueous dispersion of the polymers is obtained.

The latexes used in the two composite polymer emulsions have solids contents of 40~50 percent each.

Now an example of the composition of and mixing procedure for forming the following principal ingredient with either of the above two composite polymer emulsions will be given.

The exemplary composition of the principal ingredient is:

| white cement | 28 wt % |
| silica sand (SiO$_2$) | 71 wt % |
| iron oxide powder (Fe$_3$O$_4$) | 0.2 wt % |
| zinc oxide (ZnO) | 0.1 wt % |
| titanium white (TiO$_2$) | 0.1 wt % |
| glycine | 0.6 wt % |

The white cement components have the following proportions by weight:

| CaO | 65.4 wt % |
| SiO$_2$ | 23.1 wt % |
| Fe$_2$O$_3$ | 0.2 wt % |
| ignition loss | 2.7 wt % |
| insolubles | 0.2 wt % |
| Al$_2$O$_3$ | 4.3 wt % |
| MgO | 0.6 wt % |
| SO$_3$ | 2.8 wt % |
| others | 0.7 wt % |

The components of the principal ingredient are mixed together in the following manner.

Coarse silica sand is fired, freed from organic impurities, and finely ground to a particle size of 50 to 150 μm. The finely divided silica sand is placed in a mixer, and the white cement is slowly added and mixed with the sand. Further, iron oxide dust (Fe$_3$O$_4$), zinc oxide (ZnO), titanium white (TiO$_2$), and glycine are added in that order and the components are mixed up uniformly.

Next, an exemplary method of preparing a surface coating agent by mixing the principal ingredient with either of the composite polymer emulsions will be explained.

Where a coating film from 0.6 to 1.0 mm thickness is to be formed over a surface area of one square meter, 1250 g of the principal ingredient is mixed with 357 g of the composite polymer emulsion. The procedure comprises first placing the composite polymer emulsion in a container, stirring it while slowly adding the principal ingredient over a period of 3 to 5 minutes, and then adding water, with stirring, to attain the viscosity required for coating.

Although, in the above example, the ratio between the composite polymer emulsion and the principal ingredient is determined to be 1:3.5, such ratio can be varied from 1:2.0 to 1:6.0.

When the ratio is 1:2.0, the surface coating agent has a sufficiently fluidity so that it can be readily filled into the fine cracks formed in the concrete by means of a pressure pump or the like.

However, when the ratio becomes less than 2.0, the surface coating agent has an excessive fluidity so that the adhering force is lowered.

Meanwhile, when the ratio is 6.0, the surface coating agent can be utilized to fill in profiled recesses formed in the concrete.

However, when the ratio is more than 6.0, the surface coating agent becomes bulky so that again the adhering force is lowered.

The surface coating agent thus prepared is employed as follows:

In coating iron, zinc, concrete, wood, asphalt, plastics, including polyethylene and polypropylene, glass, FRP, rubber, ceramic, or other similar surfaces, the coating agent is applied with a brush, spray gun or the like. The coating film will harden at ambient temperature in about 8 hours. A jet of hot air at 80° C. will cure it completely in only 10 to 20 minutes.

When the substrate is a vertical wall or ceiling, the water to be added to the polymer emulsion should be soft or distilled water, because it prevents sagging during application and avoids separation of the principal ingredients from the rest of the composition. The use of soft or distilled water is advisable also for pipes, angles, or other small articles, or hollow objects the inner walls of which must also be coated.

Soft or distilled water enables the coating composition to retain sufficient fluidity for dip coating and yet prevents separation or settling of the principal ingredients. In coating stainless steel, it is desirable to use completely dechlorinated distilled water.

Examples of the invention are as described above, and the surface coating agents obtained accordingly have features or physical properties as given in Table 1.

TABLE 1

| Property | Feature or physical property values |
| --- | --- |
| Form | aqueous slurry |
| Curing time | 10 min to less than 8 hr |
| Curing temperature | 20 to 80° C. |
| Compression strength | 222.0 kgf/cm$^2$ |
| Bending strength | 73.0 kgf/cm$^2$ |
| Tensile strength | 26.3 kgf/cm$^2$ |
| Weather resistance | 3000 hr |
| Adhesion strength | 22 kgf/cm$^2$ |
| Water resistance | 9.5 kgf/cm$^2$ |
| Alkali resistance | 18.0 kgf/cm$^2$ |
| Corrosion resistance | 11.0 kgf/cm$^2$ |

TABLE 1-continued

| Property | Feature or physical property values |
|---|---|
| Salt-spray fog resistance | 15.8 kgf/cm² |
| Ozone resistance | 17.4 kgf/cm² |
| Heat resistance | 18.0 kgf/cm² at 300° C. for 3 hr |
| Cold resistance | 17.4 kgf/cm² at −183° C. for 3 hr |
| Bending resistance | no crack |
| Impact resistance | no failure |
| Freezing-Melting resistance | no weight change |

The physical property values given in Table 1 were measured by the following methods.

(a) Compression strength test was conducted in conformity with the Japanese Industrial Standard R 5201. A testpiece of 50 mm diameter and 100 mm length was compressed by an axial force until the piece was ruptured.

(b) Bending strength test was conducted in conformity with the Japanese Industrial Standard R 5201. A testpiece of 40 mm×40 mm×160 mm was bent by applying a concentrated weight on the center of the testpiece which has both ends supported on a base.

(c) Tensile strength test was conducted in conformity with the Japanese Industrial Standard A 1113. A testpiece of 50 mm diameter and 100 mm length was provided with a weight in a direction perpendicular to the axis of the testpiece until cracks occur on the surface of the testpiece.

(d) Weather resistance test was conducted by applying light beams and water under following conditions onto the surface coating agent coated on the iron plate at a thickness of 1 mm.

| | |
|---|---|
| temperature of black panel | 59~63° C. |
| water shower cycle | 18 min/120 min |
| mean discharge voltage | 50 V |
| mean discharge current | 60 A |
| test period | 3000 hr (equivalent to the exposure under sun 15 years) |

(e) The adhesion strength test was conducted in conformity with the Japanese Industrial Standard A 6909. A piece of galvanized sheet iron was coated with the surface coating agent to a film thickness of 300 μm. On a load cell type tester having a capacity of 100 kgf, the coating film in a circle 20 mm across the test piece was subjected to a peeling test at a pulling speed of 5 mm/min.

(f) Water resistance was determined in terms of the adhesion strength of a coated film formed in the same way as above on the same substrate after 96 hours of immersion in distilled water at 40° C.

(g) Alkali resistance was determined also in terms of the adhesion strength after immersion in an aqueous solution saturated with calcium hydroxide at 40° C. for 96 hours.

(h) Corrosion resistance was determined in terms of the adhesion strength after 96 hours of immersion in an aqueous solution of sodium chloride adjusted with distilled water to a chloride concentration of 5%, at 40° C.

(i) Salt-spray fog resistance was evaluated in terms of the adhesion strength after spraying of the coated surface with an aqueous solution of sodium chloride adjusted with an ion-exchange resin to a chloride concentration of 5±1%, for a period of 120 hours.

(j) Ozone resistance was determined in terms of the adhesion strength after 240 hours of standing in a tank containing ozone at a concentration of 10 ppm at 40±1° C.

(k) Cold resistance was determined by coating a piece of galvanized sheet iron with the surface coating agent at a rate of 12 kg/m², refrigerating the coated piece with liquid oxygen (b.p. −183° C.) as the refrigerant for 3 hours, allowing it to warm up to ordinary temperature, and then measuring the adhesion strength of the coating using a load cell type tester having a capacity of 500 kgf.

(l) High-temperature resistance was determined by applying the surface coating material onto a piece of galvanized sheet iron at a rate of 12 kg/m², heating the coated piece at 300° C. for 3 hours, allowing it to cool down to ordinary temperature, and then measuring the adhesion strength of the coating by means of a load cell type tester having a capacity of 500 kgf.

(m) Bending resistance was evaluated in conformity with JIS K 5400, by coating core rods having different diameters of 2, 3, 6 and 8 mm, inspecting the bent rods to see if there occurred any cracking or peeling.

(n) Impact resistance was determined in accordance with JIS G 3492, by immersing a coated piece in water at 25° C. for one hour, dropping a steel ball weighing 545 g from a height of 2.4 m, and then inspecting the surface for any trace of cracking or other irregularity.

(o) Freezing-melting resistance test was conducted in conformity with the standard of ASTM C 666. The testpiece of 100 mm×100 mm×400 mm was immersed in water and the temperature of the water was changed for 300 cycles at intervals of 4 hours and through a temperature range of 4.5° C. to −18° C.

As indicated in Table 1, the surface coating agent of the invention cures in a relatively short period of time to enhance the application efficiency.

With broad ranges of tolerances for use at very high and low temperatures, it is applicable in diverse environments.

The great adhesion strength enables it to adhere firmly to varied substrate materials.

This coating agent has sufficient compression and bending strengths to accommodate the expansion of substrates, especially metals that undergo considerable thermal expansion with temperature changes.

Furthermore, it is useful in universal environments thanks to its excellent resistance to corrosive attacks, water, weathering, alkalis, and oils.

For example, it withstands rigorous service conditions of bridges laid across straits that are subjected to drastic temperature changes and accordingly undergo repeated thermal changes resulting in expansion and contraction while being exposed to the spray of sea water.

It is useful as linings of service water and sewer pipes that are difficult to maintain, required to be durable for long periods, and are exposed to acidic, alkaline, and other fluids.

It can be satisfactorily employed as linings of sea water pipes that are normally in contact with briny water.

Where a substrate to be coated is metal, especially iron, that tends to corrode with oxidation by oxygen in the air, the strength of the surface coating agent of the invention in bonding with metal ions can be taken advantage of in utilizing the oxidizing function of the metal itself. The coating agent allows rust to form permeatingly in the surface to provide a strong oxide film coating for protection against corrosion.

Zinc oxide (ZnO) among, which is in the principal ingredient, reacts with various polymers to effect cross-linking, thereby adding strength to the resultant coating film.

Glycine is incorporated so as to impact curability to the polymers.

The fatty acid in the composite polymer emulsion stabilizes the emulsion, degreases the coating surface, and improves the leveling property at the time of application.

Since the coating agent is of an emulsion type, it does not contaminate the environment due to evaporation of an organic solvent during its application. It can be applied by means of a spray gun or by dip coating, without separation or settling of components of the principal ingredient.

To recapitulate the advantages of the surface coating agent according to the invention, they are as follows:

(a) For coating walls and ceilings, it may be prepared to be of viscosity suitable for application by spray guns. With that viscosity, it forms tough, even coating films without settling of components of the principal ingredient or sagging of the film.

(b) For pipes, angles, and other small objects or those which must be coated on the inner walls too, the coating agent may be adjusted to an application viscosity low enough for dip coating. It forms tough, even coating films without settling or separation of the principal ingredients.

(c) It adheres well to iron, galvanized iron, and such surfaces, and the resulting film is flexible enough to follow bending or distortion of the coated steel sheet or the like.

(d) The coating film is tough enough to be only locally damaged by impacts of heavy objects, without any cracking or peeling.

(e) The film imparts elasticity, water resistance, and weathering resistance to concrete surfaces.

(f) Resistant to temperatures in a broad range from 300° C. down to −183° C.

(g) Nonflammable and safe to handle.

(h) Hot air at below 80° C. is enough to promote the drying of the film after application and also the attainment of the coating effect, thus improving the coating efficiency.

(i) Very extensive, diversified applications. For example, the coating agent bonds and imparts corrosion resistance, water resistance, and elasticity to a great variety of objects, such as: paints for bridges spanning straits or channels, linings for service water and sewer pipes, linings for sea water pipes, double water-sealants, agents for maintenance of power plants, agents for preventing gas bursting of coal mines, agents for protecting slurries in transportation, agents for protecting railroad ties, antirust agents for ships, rustproofing agents for automobile bottom chassis plates, paints for protecting electric-light and telephone poles (and cables), antirust coatings for petroleum tanks, paints for small boats and vessels, coatings for gas pipes and gas tanks, binders for bonding lagging onto liquefied gas tanks, sealants for nuclear power plants, antirust coatings for industrial stacks and towers, coatings for secondary concrete products, agents for maintenance of water tanks on top of buidings, antirust paints for viaducts and iron bridges, waterproofing agents for tunnels, corrosion-resisting and waterproofing agents for prefabricated houses, antirust coatings for sea berths and steel pools, agents for protecting slopes, antiweathering agents for concrete dams, and antirust coatings for water gates. The coating agent of the invention has also extensive other applications as adhesives and bonding agents.

Second Embodiment

The preferred methods for utilizing the above-mentioned surface coating agent are hereinafter disclosed with the aid of several examples.

Figure 1:
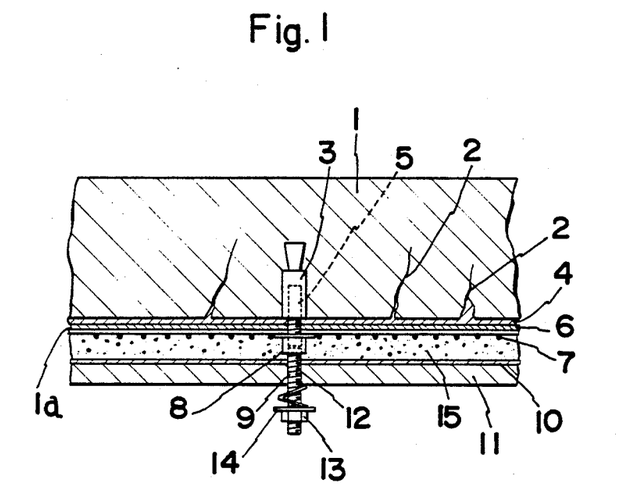
FIG. 1 is a transverse cross-sectional view of the floor plate repaired by the method of the first example of the second embodiment of the present invention.
Figure 2:
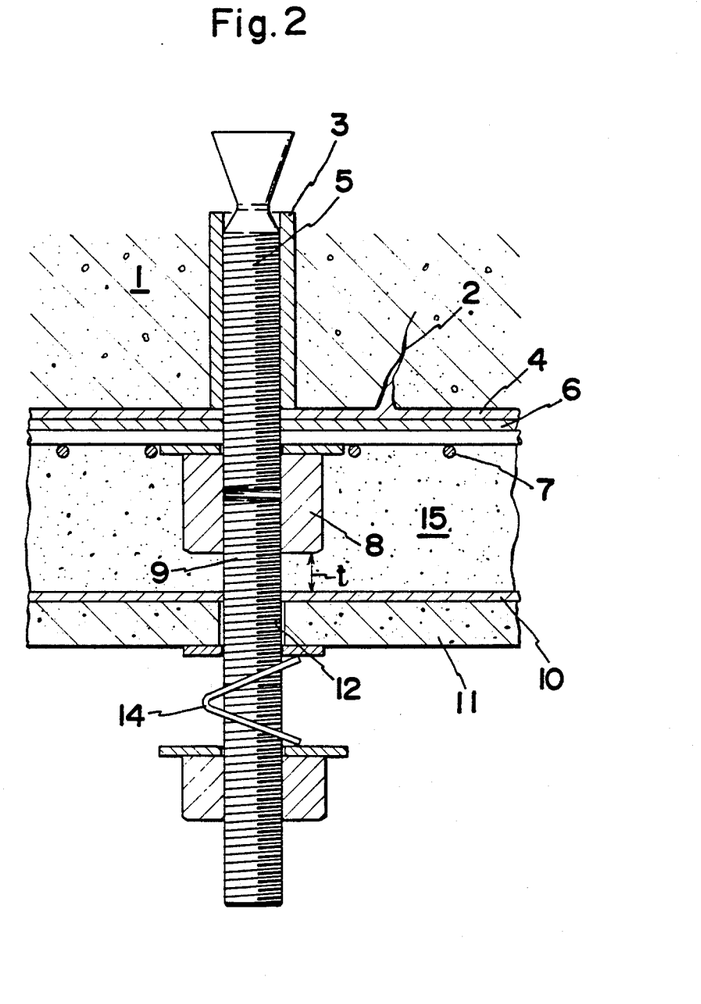
FIG. 2 is an enlarged view of the above floor plate.
Figure 3:
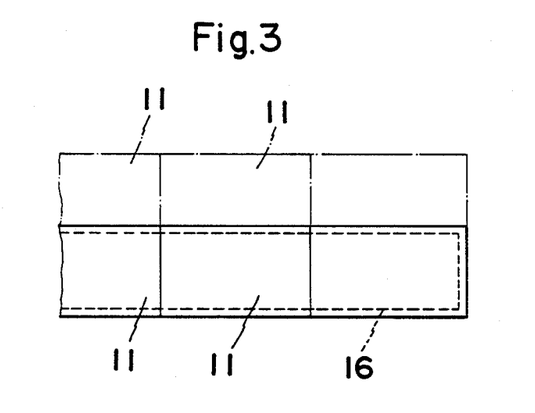
FIG. 3 is an explanatory view which shows the mounting position of the concrete relative to the floor plate.

FIRST EXAMPLE (FIG. 1~FIG. 3)

In this example, the material of this invention is used for repairing a floor plate of a bridge made of concrete.

In FIG. 1 to FIG. 3, numeral 1 indicates a concrete floor plate of a bridge which has several cracks on the lower surface thereof.

For repairing such floor plate, the portion of the lower surface 1a where a crack of 1 mm width is located is cut in a V shape of 2 cm width and 2 cm depth.

Then, a plurality of hole-in-anchors 3 are driven into the floor plate 1 as shown in FIG. 2.

Subsequently, the composite polymer emulsion which is described in the first embodiment and diluted with an equal proportion of water is sprayed onto the lower surface twice by a spray gun and then cooled to be hardened thus forming a polymer film 4 on the lower surface 1a of the floor plate 1.

Then, the upper end of an upper bolt 5 is screwed into the hole-in-anchor 3.

A mixture is produced by mixing together the polymer emulsion and the principal material which are described in the first embodiment in a ratio of 1:3.5 and to the mixture is added a suitable amount of water to assure the viscosity necessary for casting.

The reason for setting the mixing ratio of the surface coating agent at 1:3.5 is that such surface coating agent has sufficient fluidity and facilitates the adhering to the floor plate a subsequently applied surface coating agent having a mixing ratio of 1:5.

Such water containing mixture is then applied onto the surface of the polymer film 4 under a pressure of 5 kg/cm$^2$ to form an upper layer 6 of about 500 μm thickness.

Over the lower surface of the upper layer 6, a wire mesh 7 is extended and the wire mesh 7 is supported by a plurality of spacer nuts 8 which are threadedly engaged with the lower end of the upper bolt 5.

Then, the upper end of a lower bolt 9 is screwed into the spacer nut 8 so that the lower bolt 9 is vertically supported below the spacer nut 8.

Subsequently, a concrete panel 11 which has a vinyl sheet 10 firmly adhered to the upper surface thereof is disposed and held below the wire mesh 7 with a suitable gap or space.

The lower bolt 9 is inserted into a bolt opening 12 which is formed in the panel.

A nut 13 is threadedly engaged with the lower end of the lower bolt 9 and urges the panel 11 upwardly making use of the biasing force of a leaf spring 14 disposed between the panel 11 and the nut 13.

Due to such construction, the concrete panel 11 is urged into contact with the spacer bolt 8 and a filler-space is defined between the wire mesh 7 and the concrete panel 11.

The surface coating agent of the present invention which is produced by mixing the principal ingredient and the composite polymer emulsion at a mixing ratio of 1:5 is filled in the filler-space under pressure as the adhering agent.

Such filling operation is continued until the concrete panel 11 is lowered to a desired level against the biasing force of the leaf spring 14.

Finally, the nut 13 is fastened to increase the biasing force of the leaf spring 14 so that the concrete panel 11 is firmly attached to the bottom plate 1.

It must be noted that the compression gap (t) must be maintained between the spacer nut 8 and the concrete panel 11 so that an upward biasing force is constantly applied to the concrete panel 11.

In about four weeks, the lower bolt 9 is removed and the concrete panel 11 is peeled off so as to provide a lower coating layer 15 of about 20 mm thickness.

Figure 4:
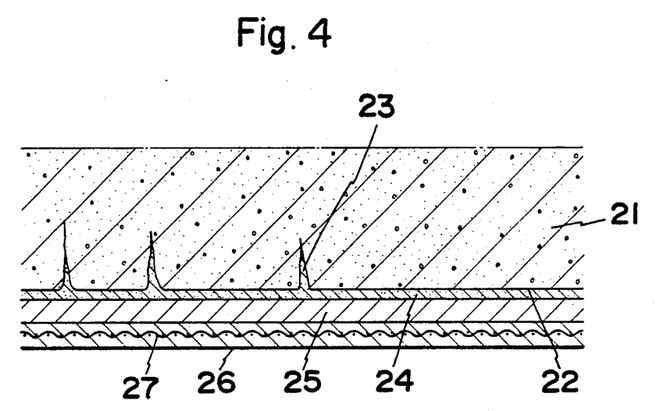
FIG. 4 is a transverse cross-sectional view of the floor plate repaired by the method of the second example of the second embodiment of the present invention.
Figure 5:
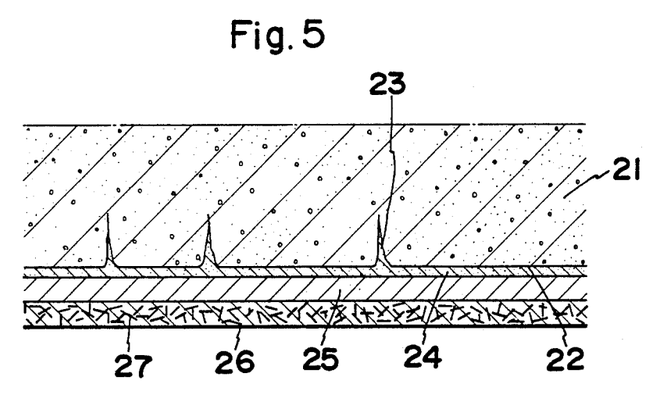
FIG. 5 is a transverse cross-sectional view of the floor plate repaired by the modification of the second embodiment.

SECOND EXAMPLE
(FIG. 4, FIG. 5)

In FIG. 4, numeral 21 indicates a concrete floor plate which has a plurality of cracks 23 on the lower outer surface 22 thereof.

Such outer surface 22 is primarily formed into a rough surface by an electric drilling machine or highly pressurized water jet gun.

Numeral 24 indicates a composite polymer emulsion described in the first embodiment which is applied onto the outer surface 22 such that the emulsion 24 fills the cracks 23. Th development of cracks 23 can be effectively prevented by the bonding strength of the emulsion. Numeral 25 indicates a first lining layer which also works for preventing the development of cracks 23 by the bonding strength thereof.

The first lining layer 25 is made of the surface coating agent of the present invention which is prepared by mixing the composite polymer emulsion with the principal ingredient at a ratio of 1:3.5.

Numeral 26 indicates a second lining layer which is also prepared by mixing the above composite polymer emulsion and the principal ingredient at a mixing ratio of 1:5.0. The layer 26 is adheringly applied onto the first lining layer 25 and has glass fibers 27 embedded therein.

Due to such construction, coupled with the excellent tensile strength of the glass fibers 27, the second lining layer 26 can exhibit an extremely high tensile strength, thus further preventing the development of the cracks 23 on the outer surface 22 of the floor plate 1.

Although, in FIG. 4, the glass fibers 27 are embedded in the second lining layer 26 as a glass fiber sheet, the glass fiber 27 can be embedded in other forms such as mixing a glass fiber staples into the second lining layer 26 as shown in FIG. 5.

Figure 6:
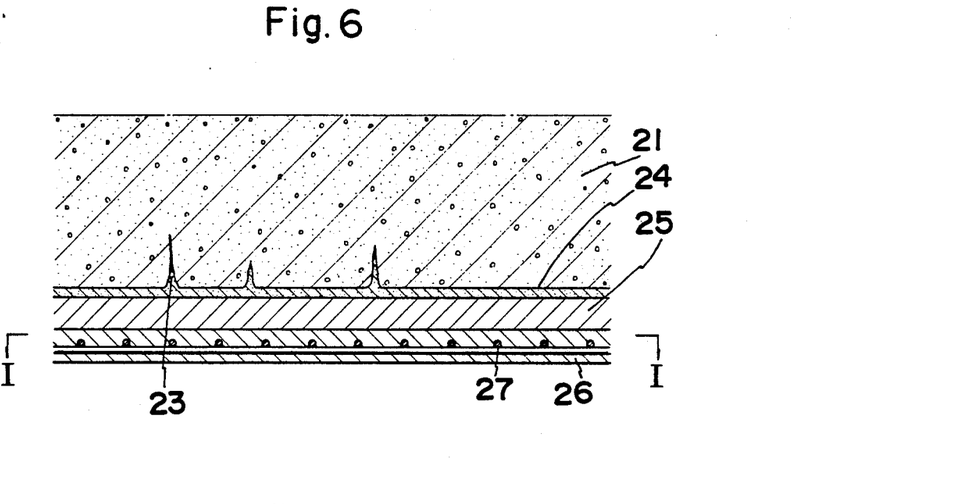
FIG. 6 is a transverse cross-sectional view of the floor plate repaired by the method of the third example of the second embodiment.
Figure 7:
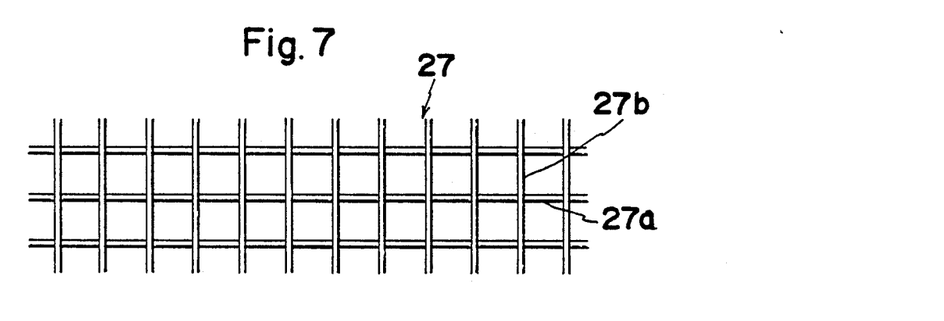
FIG. 7 is a plan view of the above floor plate taken along the line I—I of FIG. 6.

THIRD EXAMPLE
(FIG. 6, FIG. 7)

This example is a modification of the second example, wherein a wire mesh screen is embedded in the second lining layer.

As shown in FIG. 6 and FIG. 7, the wire mesh screen 27 is made of a plurality of lateral and longitudinal steel wires 27a, 27b which cross perpendicularly.

These wires 27a and 27b are welded together at crossing points. The interval between wires 27a, 27a and 27b, 27b is preferably 5.0 mm, while the diameter of the wires 7a, 7b is preferably 2~6 mm.

The diameter of the wires 27a, 27b, however, varies depending on the extent of cracking on the outer surface of the floor plate.

Figure 8:
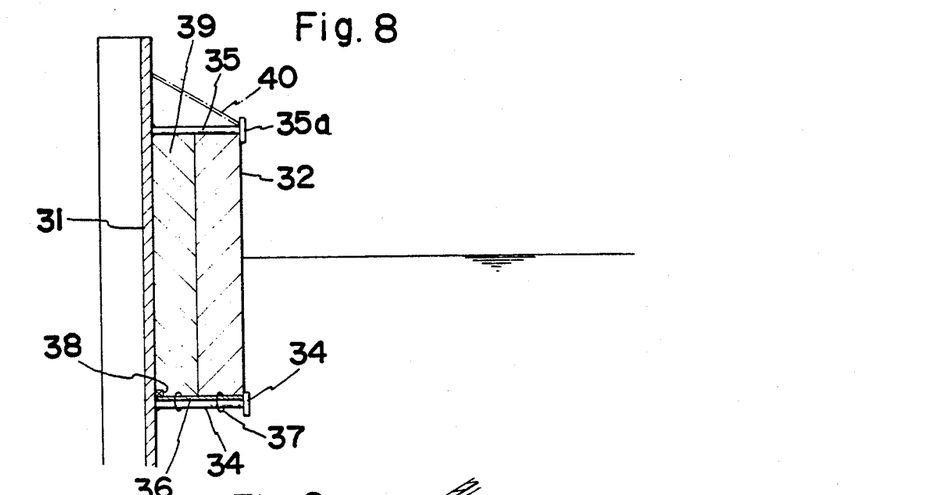
FIG. 8 is a transverse cross-sectional view of the steel pile plate repaired by the method of the fifth example of the second embodiment.
Figure 9:
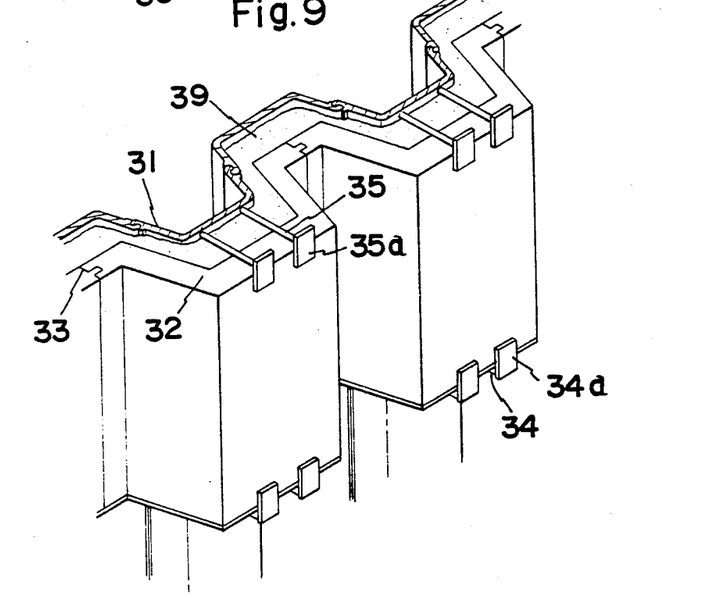
FIG. 9 is a schematic view of the repaired pile plate.
Figure 10:
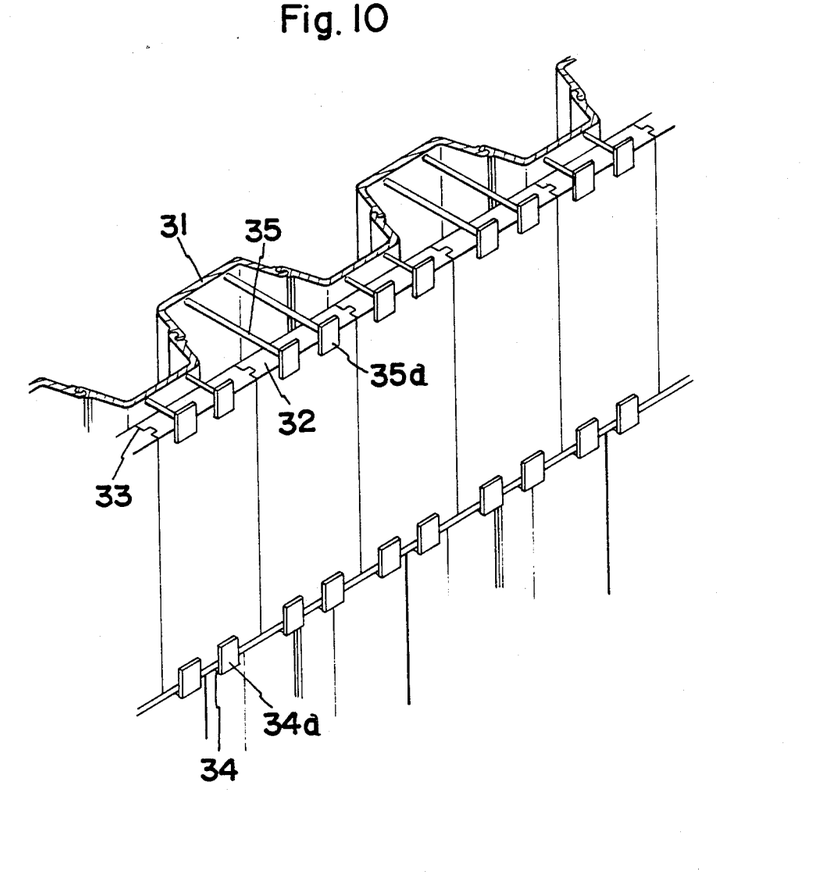
FIG. 10 is a schematic view of the another repaired pile plate.

FOURTH EXAMPLE
(FIG. 8~FIG. 10)

In this example, the surface coating agent is used as the material for protecting the splash zone of a pile plate.

In FIG. 8 and FIG. 9, numeral 31 indicates a plurality of steel pile plates which are connected in series and piled to the water bed.

The pile plates 31 have a splash zone where the water surface comes into contact with the surface of the pile plate.

Numeral 32 indicates a plurality of anti-corrosion concrete plates (reinforced concrete of P.C) which are disposed parallel to the pile plate 31 with a predetermined space (for example, 1 cm) therebetween.

Such concrete plates 32 have a width which sufficiently covers the splash zone of the pile plate 31.

The concrete plates 32 are connected in series by a bonding rubber 33.

In FIG. 8, B indicates a water level.

Also in FIG. 8, numerals 34 and 34 indicate lower and upper support struts for supporting concrete plates 32 at the splash zone. The proximal end of each of struts 34 and 35 is welded to the pile plate 31 and the distal end of each is provided with a bracket (34a), (35a) for retaining the concrete plate 32.

Numeral 36 indicates an elongated bottom plate which is preferably made of plastic or plywood.

For preventing the buoyancy of the water from separating the bottom plate 36 from the lower support struts 34, the bottom plate 36 has a plurality of apertures through which connecting strings 37 pass for joining the bottom plate 36 to the lower support strut 34.

Numeral 38 indicates a packing which is inserted at the juncture between the bottom plate 36 and the pile plate 31.

Due to such construction, an adhering agent filling space is defined by the pile plate 31, the concrete plate 32 and the bottom plate 36 and the surface coating agent of the present invention is filled into the adhering agent filling space to form a body of adhering agent 39 which firmly adheres the concrete plate 32 to the steel pile plate 31, whereby the splash zone of the steel pile plate 31 is protected from the occurrence of rusting.

In this example, such surface coating agent is prepared by mixing the composite polymer emulsion and the principal ingredient of the first embodiment at a mixing ratio of 1:5.0.

The surface coating agent 39 may be charged into the adhering agent filling space through an upper opening of the space or through an opening formed in the bottom plate 38.

In FIG. 8 and FIG. 9, numeral 40 indicates a ceiling plate which is installed over the adhering agent filling space.

In FIG. 10, a modification of this embodiment is shown, wherein the concrete plate 32 is a flat plate.

Figure 11:
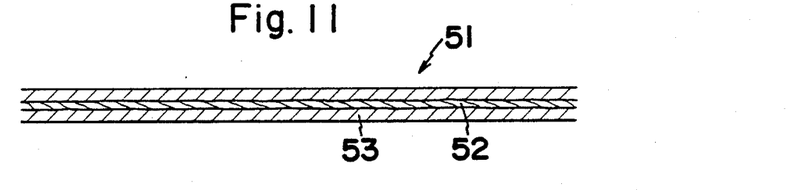
FIG. 11 is a transverse cross-sectional view of the water-proof sheet used in the method of the sixth example of the second embodiment.
Figure 12:
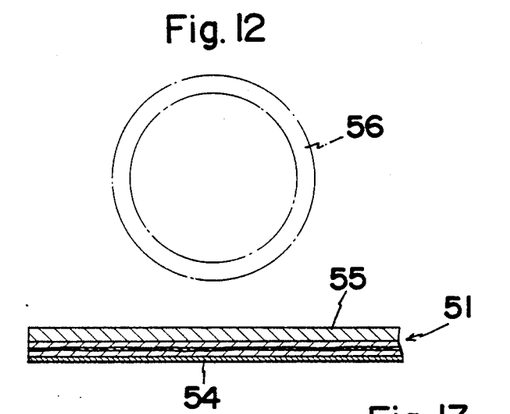
FIG. 12 is an explanatory view showing the manner of winding the water-proof sheet around the steel pile.
Figure 13:
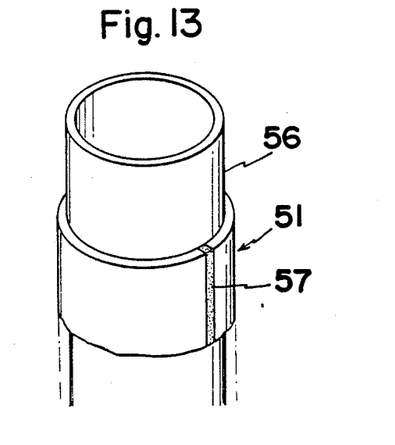
FIG. 13 is a schematic view of the repaired steel pile.

FIFTH EXAMPLE
(FIG. 11~FIG. 13)

In this example, the surface coating agent of this invention is used for protecting a pile made of steel pipe from rusting.

In FIG. 11 and FIG. 12, numeral 51 indicates a waterproof sheet and such sheet 51 is produced by impregnating a lining material 53 made of the surface coating agent of the present invention into a fabric of open mesh such as victoria lawn and then drying the impregnated fabric.

In the above construction, since the fabric 52 and the lining material 53 each have sufficient tensile strength, the occurrence of cracks on the lining material 53 can be effectively prevented by the coupled effect of the fabric 52 and the lining material 53.

In this example, the surface coating agent is produced by mixing the composite polymer with the principal ingredient at a mixing ratio of 1:3.5.

The water-proof sheet 51 which is produced in the above manner is, as shown in FIG. 13, wound around and adhered to the outer surface of a pile 56 made of steel pipe by means of an adhering agent which is produced by mixing the composite polymer emulsion with the principal ingredient at a mixing ratio of 1:3.5~5.0.

In the above winding operation, a belt may be used to fasten the water-proof sheet 51 to the pile 56 until the former completely adheres to the latter.

The mutually abutting edges of the wound water-proof sheet 51 are connected to each other by a water-hardening adhering agent 57.

Figure 14:
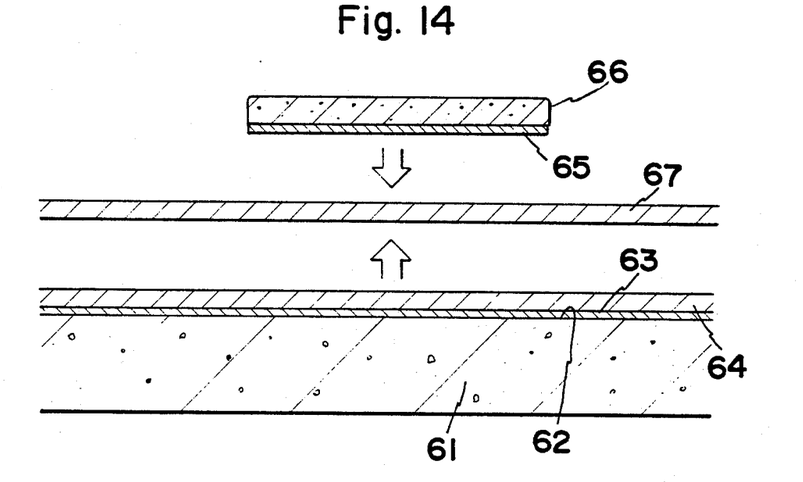
FIG. 14 is an explanatory view of the method of sixth example of the second embodiment of the present invention.
Figure 15:
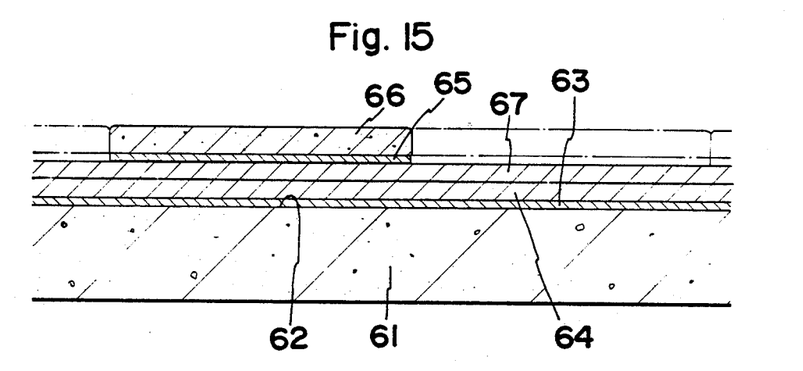
FIG. 15 is a transverse cross-sectional view of the substrate provided with tiles according to the method of the sixth example.

SIXTH EXAMPLE
(FIG. 14, FIG. 15)

In this example, the surface coating agent of this invention is used for adhering tiles to a substrate such as the floor of a bathroom.

In FIG. 14, numeral 61 indicates a substrate plate made of concrete (A1C, PC) for defining the floor of a bathroom.

As shown in FIG. 14, the substrate plate 61 has a rough surface formed by a high-pressure water or an electric drilling machine.

Due to such rough surface, the composite polymer emulsion efficiently penetrates the substrate 61.

In FIG. 14, numeral 64 and 65 indicate the first and second lining layers applied and formed on the substrate 62 and the tile 66, respectively.

Such lining layers 64 and 65 are produced by mixing the composite polymer emulsion with the principal ingredient at a mixing ratio of 1:3.5.

Furthermore, in FIG. 14, numeral 67 indicates an adhering material for adhering the first and second lining layers 64 and 65 to each other.

Such adhering material 67 is produced by mixing the composite polymer emulsion with the principal ingredient at a mixing ratio of 1:5.

Since the composite polymer emulsion, first and second lining layers 64, 65 and adhering material 67 have excellent physical and/or chemical properties, the tiles 66 can be firmly adhered to the substrate 61 due to the adhering force and the tensile strength of the materials.

In the above lining layers 64, 65, the mixing ratio of the composite polymer emulsion and the principal ingredient is 1:3.5, this owing to the fact that by increasing the proportion of the composite polymer emulsion, the drying of the lining material lowers the adhering agent.

What is claimed is:

1. A surface coating agent for civil engineering and construction engineering essentially consisting of a mixture made of (a) a principal ingredient including cement, silica sand, iron oxide, zinc oxide and glycine and (b) a composite polymer emulsion including carboxy-modified styrene-butadiene, cyclohexyl methacrylate, and styrene polymers, wherein the mixing ratio of said mixture is 2–6:1.

2. A method for using a surface coating agent for civil engineering and construction engineering wherein said method comprises (i) applying a composite polymer emulsion essentially consisting of carboxy-modified styrene-butadiene, cyclohexyl methacrylate and styrene polymers onto a lower surface of a floor plate so as to form a composite polymer film, (ii) mounting a plurality of bolts onto the lower surface of said floor plate so as to suspend a concrete panel from said floor plate while defining a filler space between the concrete panel and said lower surface of said floor plate, (iii) applying an upwardly urging pressure to said concrete panel plate by spring means mounted on said respective bolts, and filling a surface coating agent essentially consisting of a mixture made of (a) a principal ingredient including cement, silica sand, iron oxide, zinc oxide and glycine and (b) a composite polymer emulsion including carboxy-modified styrene-butadiene, cyclohexyl methacrylate, and styrene polymers as main constituents in a mixing ratio of 5.0:1 under pressure into said filler space against the biasing force of said concrete panel.

3. A method for using a surface coating agent for civil engineering and construction engineering, wherein said method comprises (i) applying a composite polymer emulsion essentially consisting of carboxy-modified styrene-butadiene, cyclohexyl methacrylate, and styrene polymers onto a bottom surface of a floor plate of a bridge, (ii) coating said emulsion-coated lower surface of said floor with first and second lining layers which are made of a surface coating agent essentially consisting of a mixture made of (a) a principal ingredient including cement, silica sand, iron oxide, zinc oxide and glycine and (b) a composite polymer emulsion including carboxy-modified styrene-butadiene, cyclohexyl methacrylate, and styrene polymers in a mixing ratio of 5.0:1 and in which reinforcing material is impregnated.

4. A method for using a surface coating agent according to claim 3, wherein said reinforcing material is glass fibers.

5. A method for using a surface coating agent according to claim 3, wherein said reinforcing material is steel-bar mesh.

6. A method for using a surface coating agent for civil engineering and construction engineering, wherein said method comprises (i) disposing a concrete panel in a parallel spaced-apart manner from one surface of a steel pile plate standing in the water such that said concrete plate faces a splash zone of said steel pile plate, (ii) mounting a bottom plate on the lower end of said concrete plate, said bottom plate having one end extending to one surface of said pile plate, thus defining an adhering-agent-filling space and (iii) filling a surface coating agent essentially consisting of a mixture made of (a) a principal ingredient including cement, silica sand, iron oxide, zinc oxide and glycine and (b) a composite polymer emulsion including carboxy-modified styrene-butadiene, cyclohexyl methacrylate, and styrene polymers in a mixing ratio of 5.0:1 as an adhering agent into said adhering-agent filling space.

7. A method for using the surface coating agent according to claim 1 for civil engineering and construction engineering, wherein said method comprises (i) applying a composite polymer emulsion essentially consisting of carboxy-modified styrene-butadiene, cyclohexyl methacrylate, and styrene polymers onto an adhering surface of a substrate plate, (ii) applying onto said emulsion-impregnated adhering surface a first lining layer made of a surface coating agent essentially consisting of a mixture made of (a) a principal ingredient including cement, silica sand, iron oxide, zinc oxide and glycine and (b) a composite polymer emulsion including carboxy-modified styrene-butadiene, cyclohexyl methacrylate, and styrene polymers in a mixing ratio of 3.5:1, (iii) applying a second lining layer made of a surface coating agent essentially consisting of a mixture made of (a) a principal ingredient including cement, silica sand, iron oxide, zinc oxide and glycine and (b) a composite polymer emulsion including carboxy-modified sytrene-butadiene, cyclohexyl methacrylate, and styrene polymers in a mixing ratio of 3.5:1 onto a plurality of tiles, and (iv) adhering said second lining layer to said first lining layer by means of an adhering lining layer made of a surface coating agent essentially consisting of a mixture made of (a) a principal ingredient including cement, silica sand, iron oxide, zinc oxide and glycine and (b) a composite polymer emulsion including carboxy-modified styrene-butadiene, cyclohexyl methacrylate, and styrene polymers in a mixing ratio of 5:1, thus firmly adhering said tiles to said substrate plate.

* * * * *